Oct. 30, 1945.   W. Y. STOCKING   2,387,778
METHOD OF MOLDING CONTAINERS
Filed June 4, 1942   2 Sheets-Sheet 1
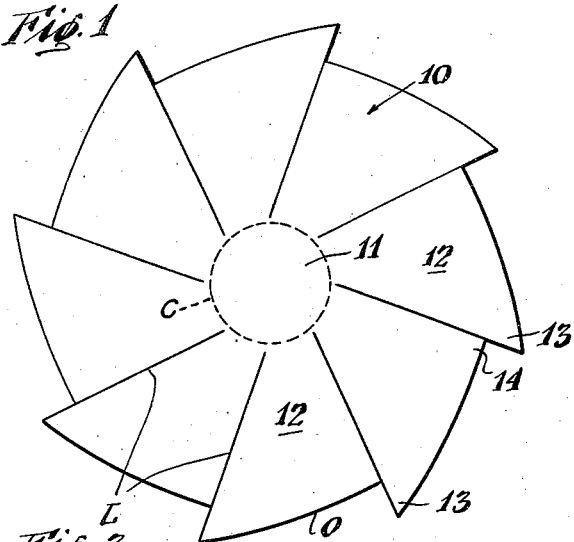
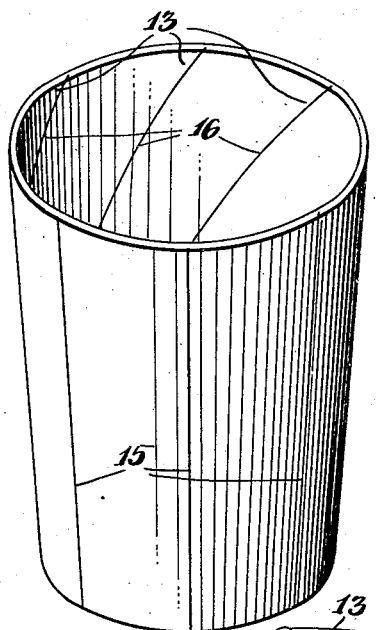
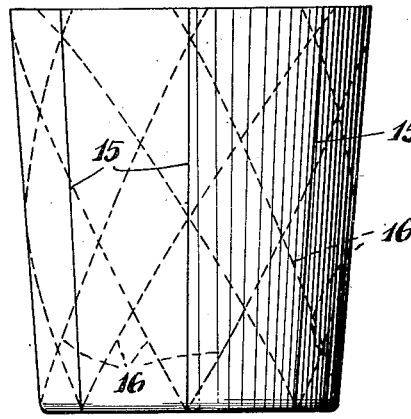
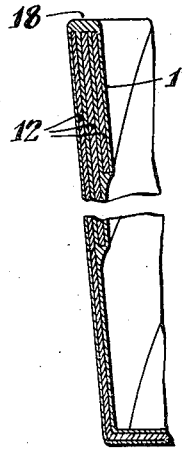
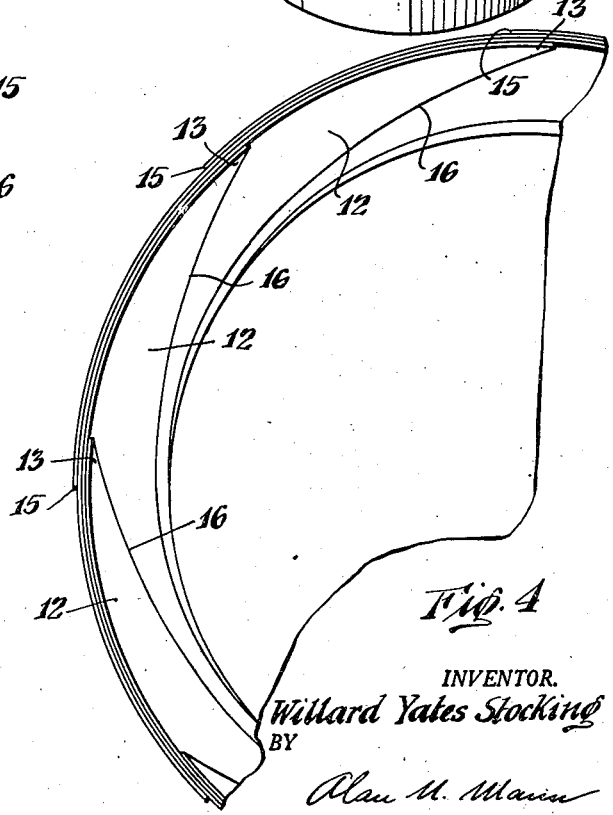
INVENTOR.
Willard Yates Stocking
BY
Alan M. Marin
ATTORNEY

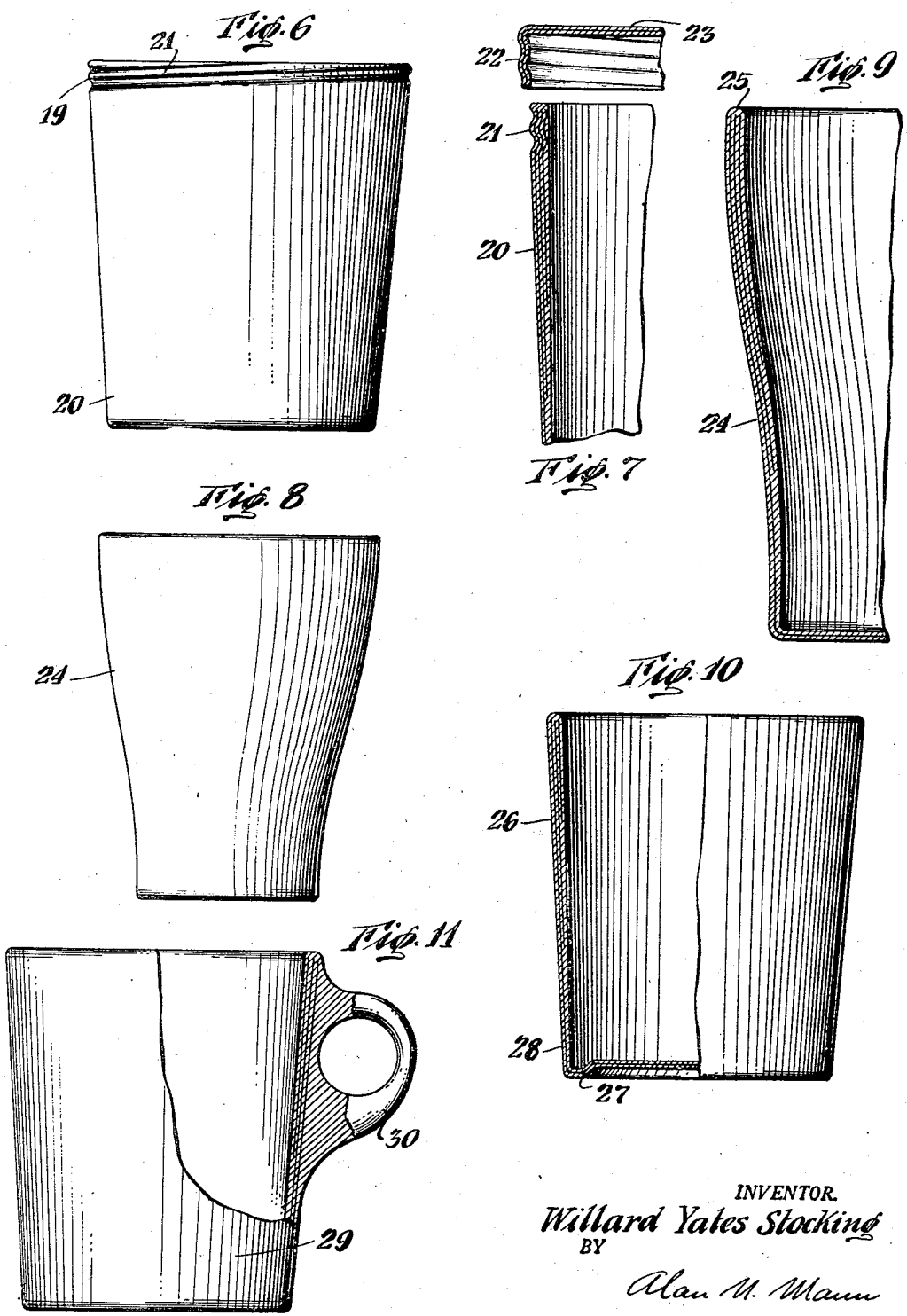

Patented Oct. 30, 1945

2,387,778

UNITED STATES PATENT OFFICE 2,387,778

METHOD OF MOLDING CONTAINERS

Willard Yates Stocking, Scarsdale, N. Y.

Application June 4, 1942, Serial No. 445,782

6 Claims. (Cl. 18—56)

This invention relates to the production from plastics of containers having relatively deep cavities and thin walls and is a continuation in part of my earlier application Ser. No. 328,953, filed April 10, 1940.

Broadly speaking, in carrying out the process of this invention I form a sheet of flexible plastic material which may be either a sheet of thermoplastic material with or without filler or may be a sheet of fibrous material, such as cloth or paper impregnated with plastic. Both of these may be termed "plastic sheets."

When a thermo-plastic material is used, it should be sheeted without an undue elimination of plasticizer so that it will be flexible and will flow readily and easily and fuse together under the action of heat and pressure to give a good finish. Likewise if a thermosetting material is employed it will ordinarily be in the form of one or more layers of paper or cloth which may be assembled into a single sheet but this sheet should not be fully cured but should remain in the state that is ordinarily employed in making laminated articles so that it will also be flexible and portions of it can fuse together.

After the flexible plastic sheet is prepared it is cut so as to provide a blank comprising a base portion and integral but independent segments or tabs protruding from said base portion adapted to be bent up to form the sides of the finished article. Such tabs or segments should be of sufficient size so that there will be a substantial overlap but the amount of overlap necessary may vary with the depth of the container as it will ordinarily be found advisable to increase the thickness of the walls of the container as they leave the base. Thus if the container has a depth equal to the width of the base the overlap of the segments should be sufficient so that at least at the mouth the container should have an average thickness equivalent to that produced from two or more layers of the plastic sheet.

The blank after being properly cut is bent to shape and inserted into a mold cavity and is subjected to pressure in conjunction with heat. In the case of thermo-plastic material the sheets may be heated in advance and there still will be sufficient flow if they are inserted into a chilled mold. With thermosetting resin the mold must be heated to cause the resin to set-up. These factors are well understood in the art. The important item from my point of view is that the pressure and the heat (whether applied in advance of insertion into the mold or through the mold walls) must be sufficient to cause the plastic to undergo limited flow and substantially homogenize the side walls. Even if the plastic sheet is an impregnated fibrous material, there will ordinarily be enough resin to cause such a limited flow to take place.

This idea of causing a flow of plastic to occur in connection with the slitted sheet is a particular and essential feature of my invention. If one is attempting to form a container from sheeted material with the aid of a mere adhesive, slitting down to a point near the base is impractical because it necessarily follows that at or near the base there is a zone with virtually no overlap which is almost sure to cause leaks. When a flowable plastic is used these weakness zones will be filled, and as they occur adjacent the point of angularity between the base and sides, a thickening of the container at this point may be permitted without injuring the appearance. By using the slitting method (as distinguished from the folding and fluting method usually employed with paper cups) the thickness of the edge of an overlap is reduced and it is a free edge instead of a fold so that compression and plastic flow can easily obliterate its edge line.

Ordinarily the shaped article will have more or less of a flare toward the open end so that it can be formed by the action of a plunger. This plunger will tend to cause the plastic or resinous material to flow downwardly in the mold. As the overlap usually will make an additional thickness near the open end of the article, this flow will tend somewhat to equalize the thickness, but ordinarily with containers having circular bases, it is advisable to have the wall of the finished article somewhat thicker near the open end than it is a short distance above the base. The fold or angle where the sides join the bottom tends in and of itself to give rigidity and may be thickened by the plastic flow, so that wall thickness near that point is not as necessary as it is near the open end. Also, by having additional thickness of plastic material near the open end, it is possible to mold into the article any desired beads, threads or the like for use in applying a closure.

In the preferred form of device made according to my invention, the base is approximately circular and the resulting product can be used as a cup or container.

In carrying out the invention, the plastic material is first sheeted. For this purpose, I may use any of the well-known thermo-plastic materials such as cellulose nitrate, or cellulose acetate, vinyl compounds, styrenes or acrylates. If desired, these thermo-plastic materials can be used without additional filler, but should contain a sufficient amount of plasticizer to give a good flow and finish, or if desired the thermo-plastic material can be incorporated with fibrous material either sheeted or unsheeted such as paper or cloth or separate threads or hairs. When a thermo-setting resin is employed, such a resin is difficult to sheet alone, and therefore this resin will ordinarily be employed in the form of impregnated sheeted fibrous material such as paper or cloth. Methods of preparing such fibrous sheets for laminating purposes are well understood in the art. Among the thermo-setting resins that may be employed are the various types of phenol-formaldehyde resins and the urea formaldehyde resins and their equivalents that are known in the art.

The manner in which the sheeted material is cut and shaped can most easily be understood by reference to the illustrative examples such as shown in the drawings, wherein:

Fig. 1 is a plan view of a blank cut and ready to be assembled into a container;

Fig. 2 is a view in perspective of the blank shown in Fig. 1 in assembled relation;

Fig. 3 is a front elevation of the container shown in Fig. 2 with the spiral reinforcing formations on the interior shown in dotted lines;

Fig. 4 is an enlarged fragmentary top plan view of the container shown in Figs. 2 and 3 illustrating the spiral formations on the interior of the container and the overlapping relation of the sides thereof;

Fig. 5 is a fragmentary longitudinal sectional view of the assembled device;

Fig. 6 is a view in elevation of a container in accordance with the invention formed with a screw thread at its top;

Fig. 7 is a fragmentary sectional view of the container shown in Fig. 6 and a portion of a closure formed with screw threads corresponding to those on the top of the container;

Fig. 8 is a view similar to Fig. 6 with the sides of the cup molded in a graceful curve and the lip of the cup molded to a safe round section;

Fig. 9 is a fragmentary sectional view of the cup shown in Fig. 8;

Fig. 10 is a view partly in elevation and partly in section illustrating a particular bottom formation of a container in accordance with the invention; and Fig. 11 is a view partly in elevation and partly in section illustrating a useful appendage such as a cup handle formed of plastic and integral with a cup in accordance with the invention.

Referring to the drawings, the blank 10, made of sheeted plastic material as hereinabove described, comprises a generally circular central portion 11 which is to form the bottom of the container and a plurality of side elements 12 extending outwardly from the circumference of the central portion 11. Each side element 12 is independent of the adjacent side elements but they are all integral with the bottom 11. In Fig. 1, the lines L represent slits and the circle C shown in broken lines is an imaginary fold line. The lines L may touch an imaginary fold line of the circle C but preferably merely approaching the same without quite reaching the point of fold so that some stretching or flow of the sheet is necessary. For example, these lines may stop as much as 1/16 inch from the fold line, provided the mold is designed to permit a slight increase of plastic concentration against the fold. However, the slitting may be brought much closer to this line. Bringing the slits only approximately to the fold line but not actually touching it helps somewhat to eliminate the "weakness zones" referred to above as occurring where the slits meet the base.

In this illustrative example, the outer margins O of the side elements 12 are cut and curved in such a manner that when the side elements are folded up as indicated in Figs. 2, 3 and 4, the said outer margins O will form a neat circular top edge in the assembled device. It will be noted in this example that the slits or lines L do not extend exactly radially from the circle C but in a direction parallel to a radius and spaced from such a radius at such a distance that if the slits or lines L were projected through the circle C they would pass approximately half way between the center and circumference of this circle. This particular arrangement is not essential but I have found it a particularly efficient way of cutting the blank for the manufacture of a cup-like device having a slight taper. When folded to form such a cup as is shown in Fig. 2, the one side of the edges of the segments 12 will run approximately up and down (these edges are indicated at 15 as being on the outside of the cup) while the other edges will run in a diagonal or spiral direction as shown at 16 on the inside of the cup.

By such an arrangement as this there is a progressively increasing thickness of the side walls towards the top of the container. Near the bases the average thickness is only slightly more than one layer, while at the top the average thickness is approximately three layers. In any event, I find it highly desirable to have the average thickness near the top at least equal to two layers of the plastic sheet (less any amount of resin that may have been displaced upon the application of pressure). If paper or other fibrous sheeted material is used, at least two layers of this sheeted filling material should be present adjacent the top.

This arrangement effects a very strong container and disposes the thickness of the blank 10 where it is most needed to effect a rigid structure in an economical manner. The bottom 11 tends to reinforce the lowermost portions of the sides where there is the least amount of plastic and as the distance increases from this reinforcement, the thickness of the side wall increases.

It is obvious that if the plastic sheet is only slitted between adjacent segments and no substantial amount of it is cut away, then with a round bottomed container the amount of overlap near the top will increase as the height of the walls increases and as the shape of the device approaches the cylindrical.

The container is pressed in the die to cause the resin or plastic material to flow. Some folding of the sides is advisable before the insertion takes place but this folding may take place as an incident to insertion in the die.

A plunger will be employed to exert pressure on the inside and the die will customarily be heated sufficiently to cause a flow of the resinous material. If thermo-plastic material is employed, the die will be cooled before being opened, whereas, this is not necessary in the case of thermo-setting material. In any event, if pressure has been properly employed, the resin should flow sufficiently to form a substantially smooth side wall which will have progressively increasing thickness from the base toward the top. The lines marking the edges of the segments 12 ordinarily will substantially disappear. In this connection, it is to be noted that such lines are formed by only one thickness of the sheet, whereas, the thickness of the wall as a whole will be at least two thicknesses (except near the bottom) thus supplying sufficient flowable plastic to cover up the cut edges.

If paper or other sheeted fibrous material is used, this may be imprinted or ornamented in any desired way, as is well understood in the art, before being impregnated, and of course any desired dyes or coloring materials may be used. In any event, the resinous material will completely cover the surface, as indicated at 17 and if the mold cavity permits, it ordinarily will flow to form edges or corners such as is indicated at 18.

Referring to Figs. 6 to 11 inclusive, the containers are shown of a character wherein the base fibrous material is coated and impregnated with the resinous material. In Figs. 6 and 7 the top 19 of the container 20 is molded with a male thread 21 to cooperate with the corresponding female thread 22 formed in a closure 23 which will cooperate with the container 20. When making a shallow structure like the closure 23, it is not feasible for the overlapping zones to give an average double thickness. In such case the whole sheet may be thickened or supplement strips may be added to fuse with the integral side portions.

In Figs. 8 and 9 the mold used in connection with the formation of the finished container 24 is curved to have an ornamental and useful contour.

The container 26 in Fig. 10 is shown as formed with a dished-in bottom 27 to provide the container with greater strength and resistance while avoiding sharp shoulders.

The cup 29 shown in Fig. 11 is formed with a handle 30 which is molded of the same type of plastic material used as the coating and impregnating composition employed in the body of the cup. Obviously, such additional material may be inserted in the mold at any desired point where thickening or strengthening or formation of additional masses is desired.

Due to the fact that the plastic material may be cut to shape, folded and inserted in the mold entirely by automatic machinery, this process forms a very inexpensive and rapid way of molding these containers. At the same time, the presheeting of the plastic material causes a uniform or controlled distribution of the material throughout the walls so that containers can be made of great depth with relatively thin walls which will be strengthened where additional strength is needed.

It is understood that the example described in detail is only given by way of illustration and that many forms of container of varying shapes and proportions can be produced in accordance with my invention.

What I claim is:

1. The method of forming an impermeable open-topped, hollow body which comprises providing a blank of a material which fuses under heat and pressure, said blank including a central portion and a plurality of segments of approximately equal size extending from the central portion and separated from adjacent segments by non-radial slits, the slits being at angles other than normal to the edge of the base and the two slits forming the side edges of each segment diverging outwardly, each side edge forming a continuous line from the edge of the base to the outer edge of the segment, said side edges being of unequal length, and the outer edge of each segment being curved from the one side edge to the other on an arc non-parallel to the edge of the base, folding the blank into the shape of a hollow body with the continuous side edges of adjacent segments overlapping along substantially their entire length and with the amount of over-lap of the segments progressively increasing from the bottom to the top of the body to form a wall in which the upper portion comprises at least two thicknesses, each segment being folded to bring its shorter edge on the outer side of the body into a substantially vertical position with the other edge at an angle to the vertical and disposed on the inside of adjacent segments, and subjecting said folded blank to the action of heat and pressure to fuse the over-lapped segments to each other.

2. The method of forming an impermeable open-topped, hollow body which comprises providing a blank of a material which fuses under heat and pressure, said blank including a central portion and a plurality of segments of approximately equal size extending from the central portion and separated from adjacent segments by non-radial slits, the length of said segments being greater than the major dimension of said central portion, the slits being at angles other than normal to the edge of the base and the two slits forming the side edges of each segment diverging outwardly, each side edge forming a continuous line from the edge of the base to the outer edge of the segment, said side edges being of unequal length, and the outer edge of each segment being curved from the one side edge to the other on an arc non-parallel to the edge of the base, folding the blank into the shape of a hollow body with the contiguous side edges of adjacent segments over-lapping along substantially their entire length and with the amount of over-lap of the segments progressively increasing from the bottom to the top of the body to form a wall in which the upper portion comprises at least two thicknesses, each segment being folded to bring its shorter edge on the outer side of the body into a substantially vertical position with the other edge at an angle to the vertical and disposed on the inside of adjacent segments, and subjecting said folded blank to the action of heat and pressure to fuse the over-lapped segments to each other.

3. The method of forming an impermeable open-topped, hollow body which comprises providing a blank of a material which fuses under heat and pressure, said blank including a central portion and a plurality of segments of approximately equal size extending from the central portion and separated from adjacent segments by slits, the two slits forming the side edges of each segment diverging outwardly, each side edge forming a continuous line from the edge of the base to the outer edge of the segment, the outer edge of each segment being curved from one side edge to the other on an arc non-parallel to the edge of the base, the side edges of each segment being of such length with respect to the distance from the base to the outer edge of the central portion of the segment that when the segments are folded the over-lapped segments form a body having a continuous upper edge with the entire outer edge of each segment lying therein, folding the blank into the shape of a hollow body with the contiguous lateral edges of adjacent segments over-lapping along substantially their entire length and with the amount of over-lap of the segments progressively increasing from the bottom to the top of the body to form a wall in which the upper portion comprises at least two thicknesses, and subjecting said folded blank to the action of heat and pressure to fuse the overlapped segments together.

4. An open-topped, hollow body formed from a blank of material that fuses under heat and pressure and comprising a bottom wall and a side wall surrounding the same, the side wall being integral with the bottom wall and comprising a plurality of segments of approximately equal size separated from each other by non-radial slits, the slits being at angles other than normal to the edge of the base and the two slits forming the side edges of each segment diverging outwardly, each side edge forming a continuous line from the edge of the base to the outer edge of the segment, said side edges being of unequal length and the outer edge of each segment being curved from one side edge to the other on an arc non-parallel to the edge of the base, the lateral edges of adjacent segments over-lapping each other throughout their entire length and the amount of over-lap of the segments progressively increasing from the bottom to the top of the body to form a wall in which the upper portion comprises at least two thicknesses, the edge of each segment on the outer side of the body being substantially vertical with the other edge at an angle to the vertical and disposed inside of adjacent segments, the over-lapped portion of the segments being fused together.

5. An open-topped, hollow body formed from a blank of material that fuses under heat and pressure and comprising a bottom wall and a side wall surrounding the same, the side wall being integral with the bottom wall and comprising a plurality of segments of approximately equal size separated from each other by non-radial slits, the slits being at angles other than normal to the edge of the base and the two slits forming the side edges of each segment diverging outwardly, each side edge forming a continuous line from the edge of the base to the outer edge of the segment, said side edges being of unequal length and the outer edge of each segment being curved from one side edge to the other on an arc non-parallel to the edge of the base, the lateral edges of adjacent segments over-lapping each other throughout their entire length and the amount of over-lap of the segments progressively increasing from the bottom to the top of the body to form a wall in which the upper portion comprises more than two thicknesses, the edge of each segment on the outer side of the body being substantially vertical with the other edge at an angle to the vertical and disposed inside of adjacent segments, the over-lapped portion of the segments being fused together.

6. An open-topped, hollow body formed from a blank of material that fuses under heat and pressure and comprising a bottom wall and a side wall surrounding the same, the side wall being integral with the bottom wall and comprising a plurality of segments of approximately equal size separated from each other by slits, the two slits forming the side edges of each segment diverging outwardly, each side edge forming a continuous line from the edge of the base to the outer edge of the segment, the outer edge of each segment being curved from one side edge to the other on an arc non-parallel to the edge of the base, the side edges of each segment being of such length with respect to the distance from the base to the outer edge of the middle portion of the segment that when the segments are folded to form a body the entire outer edges of the segments lie in and form a continuous upper edge, the lateral edges of adjacent segments over-lapping each other throughout their entire length and the amount of over-lap of the segments progressively increasing from the bottom to the top of the body to form a wall in which the upper portion comprises at least two thicknesses, the over-lapped portion of the segments being fused together.

WILLARD YATES STOCKING.